(12) United States Patent
Kim (10) Patent No.: US 10,260,432 B1
(45) Date of Patent: Apr. 16, 2019

(54) CONTROL SYSTEM OF DUAL-FUEL ENGINE

(71) Applicant: Samwoo Immersion Co., Ltd., Busan (KR)

(72) Inventor: Kyoung Suk Kim, Incheon (KR)

(73) Assignee: Samwoo Immersion Co., Ltd., Busan (KR)

( * ) Notice: Subject to any disclaimer, the term of this patent is extended or adjusted under 35 U.S.C. 154(b) by 0 days.

(21) Appl. No.: 15/712,814

(22) Filed: Sep. 22, 2017

(51) Int. Cl.
| F02D 19/06 | (2006.01) |
| F02D 19/10 | (2006.01) |
| F02D 41/00 | (2006.01) |
| F02D 41/36 | (2006.01) |
| F02D 19/12 | (2006.01) |

(52) U.S. Cl.
CPC ......... *F02D 19/0628* (2013.01); *F02D 19/10* (2013.01); *F02D 41/0027* (2013.01); *F02D 19/061* (2013.01); *F02D 19/0642* (2013.01); *F02D 19/12* (2013.01); *F02D 41/003* (2013.01); *F02D 41/365* (2013.01)

(58) Field of Classification Search
CPC ............... F02D 19/0628; F02D 19/061; F02D 19/0642; F02D 19/0025; F02D 19/10; F02D 41/003; F02D 41/365; F02D 41/0027
USPC .................................... 123/478, 525, 27 GE
See application file for complete search history.

(56) References Cited

U.S. PATENT DOCUMENTS

| 6,032,703 | A * | 3/2000 | Baker .................... B60K 15/00 141/100 |
| 2011/0088657 | A1* | 4/2011 | Tanno .................. F02D 35/028 123/305 |
| 2012/0055457 | A1* | 3/2012 | Wong .................. F02D 41/0027 123/674 |
| 2012/0109496 | A1* | 5/2012 | Hylands .............. F02D 19/0631 701/103 |
| 2014/0366840 | A1* | 12/2014 | Sivasubramanian ........................ F02D 41/0025 123/399 |
| 2016/0327464 | A1* | 11/2016 | Rasmussen ............ G01N 9/266 |

\* cited by examiner

*Primary Examiner* — Mahmoud Gimie
(74) *Attorney, Agent, or Firm* — Novick, Kim & Lee, PLLC; Jae Youn Kim (57) ABSTRACT

Provided is a dual-fuel engine control system including: a sensing unit for generating sensing information by sensing a parameter related to a dual-fuel engine; a main control unit for generating a control signal for controlling a micro-pilot injection value and a gas fuel inlet valve by analyzing a state of the dual-fuel engine on the basis of the sensing information; an EFI control unit for controlling the micro-pilot injection value and the gas fuel inlet valve on the basis of the control signal; and a deep learning unit for analyzing a state of the dual-fuel engine on the basis of the control signal transferred from the main control unit and the sensing information transferred to the main control unit at a time point of generating the control signal, and transferring an analysis result to the main control unit and the EFI control unit.

9 Claims, 1 Drawing Sheet

CONTROL SYSTEM OF DUAL-FUEL ENGINE

BACKGROUND OF THE INVENTION

Field of the Invention

The present invention relates to a dual-fuel engine control system for actively controlling a dual-fuel engine using a deep learning algorithm.

Background of the Related Art

Recently, development of alternative energy and high-efficiency eco-friendly techniques is actively progressed throughout the industry to improve air pollution.

Reduction of exhaust gas exhausted from an engine is needed for eco-friendly internal combustion engines. The method of reducing the exhaust gas may be divided into a pre-processing method of reducing generated exhaust gas by an engine itself and a post-processing method of reducing the exhaust gas by processing the exhaust gas exhausted from an engine.

To reduce the exhaust gas exhausted from an engine, a dedicated natural gas engine and a dual-fuel engine capable of using both natural gas and diesel are used.

The dual-fuel engine uses diesel fuel as an ignition source and natural gas to generate power of the engine and requires a control system for individual control of the two types of fuels.

Such a dual-fuel engine has a problem in that since knocking is generated due to abnormal combustion of the engine, there are occasions in which the engine is damaged.

SUMMARY OF THE INVENTION

An object of the present invention is to derive a most appropriate fuel injection timing according to load variation of a dual-fuel engine and a condition of the dual-fuel engine.

In addition, another object of the present invention is to prevent damage of a dual-fuel engine by predicting generation of knocking in advance and promptly processing the generation of knocking.

To accomplish the above objects, according to one aspect of the present invention, there is provided a dual-fuel engine control system comprising: a sensing unit for generating sensing information by sensing a parameter related to a dual-fuel engine; a main control unit for receiving the sensing information from the sensing unit and generating a control signal for controlling a micro-pilot injection value and a gas fuel inlet valve by analyzing a state of the dual-fuel engine on the basis of the sensing information; an EFI control unit for receiving the control signal generated by the main control unit and controlling the micro-pilot injection value and the gas fuel inlet valve on the basis of the control signal; and a deep learning unit for analyzing a state of the dual-fuel engine on the basis of the control signal transferred from the main control unit and the sensing information transferred to the main control unit at a time point of generating the control signal, and transferring an analysis result to at least one of the main control unit and the EFI control unit.

In addition, when a certain analysis result is received from the deep learning unit, the EFI control unit controls the micro-pilot injection value and the gas fuel inlet valve before receiving the control signal from the main control unit.

DESCRIPTION OF SYMBOLS

10: Micro-pilot injection valve
20: Gas fuel inlet value
110: First sensing unit
111: Water temperature sensor
112: Rotation counter sensor
113: Filter pressure sensor
120: Second sensing unit
121: Pressure sensor
122: Knocking sensor
123: Motor rotation counter sensor
124: First phase sensor
125: Second phase sensor
200: Main control unit
210: First sensing information input unit
220: Sensing information transfer unit
230: Engine state determination unit
240: Control signal transfer unit
250: Control signal information transfer unit
300: EFI control unit
310: Second sensing information input unit
320: Second sensing information transfer unit
330: First valve control unit, 340: Second valve control unit
400: Deep learning unit
410: Third sensing information input unit
420: Control signal information input unit
430: Big data learning unit

DETAILED DESCRIPTION OF THE PREFERRED EMBODIMENT

Hereafter, a dual-fuel engine control system according to an embodiment of the present invention will be described in detail with reference to the accompanying drawings. However, the terms and words used in the embodiments described below should not be limited to commonly-used or dictionary meanings, but should be interpreted as meanings and concepts relevant to the technical spirits of the invention based on the fact that the inventor may properly define the concept of the terms to explain the invention in best ways. Therefore, the embodiments described in the specification and the configurations depicted in the drawings are only most preferable embodiments and do not represent all technical spirits of the invention, so it should be understood that various equivalents and modifications that can substitute for them may exist at the time of filing this application.

A dual-fuel engine of the present invention may process evaporation gas (hereinafter, referred to as gas fuel) more efficiently since it may use both the evaporation gas and diesel oil as a fuel. A plurality of dual-fuel engines may be installed in large-scale combustion engines, and each of the dual-fuel engines may be driven in a gas mode that may use gas as a fuel and an oil mode that may use diesel as a fuel. The gas mode and the oil mode can be controlled in mixed way according to the control environment of each mode. Diesel fuel and/or gas fuel is injected into the combustion chamber of a cylinder by a mechanical operation timing according to drive of a gear train, which is a gear box, engaged with the crankshaft of the dual-fuel engine.

Figure 1:
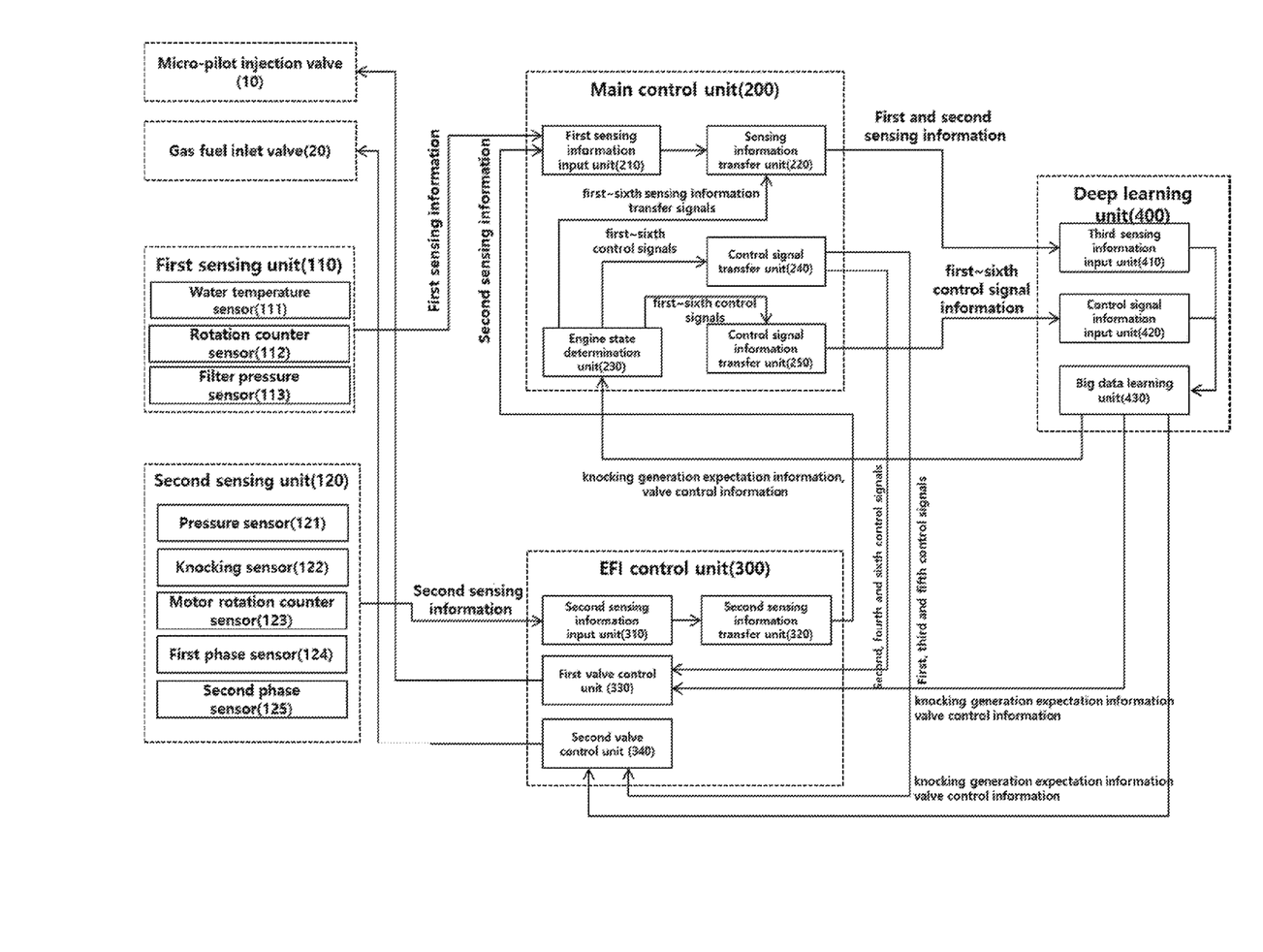
FIG. 1 is a view showing a dual-fuel engine control system according to an embodiment of the present invention.

A main control unit 200 of the present invention is installed at a place remote from a plurality of dual-fuel engines and controls the plurality of dual-fuel engines in an integrated manner. However, an Electric Fuel Injection (EFI) control unit 300 of the present invention is installed in a region of the dual-fuel engine or at a place relatively close to the dual-fuel engine and locally controls one dual-fuel engine. Accordingly, if sensing information is transferred to the EFI control unit 300, parameters can be transferred faster and more correctly, compared with transfer of the sensing information to the main control unit 200.

A first sensing unit 110 of the present invention creates first sensing information by sensing a parameter which determines whether or not to drive the dual-fuel engine. In an embodiment, the first sensing unit 110 may include at least one of a water temperature sensor 111 for sensing temperature of coolant, a rotation counter sensor 112 for sensing the number of rotations of the engine, and a filter pressure sensor 113 for sensing pressure of a fuel filter. The first sensing unit 110 may transfer at least one of information on the temperature of the coolant, information on the number of rotations of the engine, and information on the pressure of the fuel filter to a first sensing information input unit 210 included in the main control unit 200.

A second sensing unit 120 of the present invention creates second sensing information by sensing parameters related to injection of fuel into the dual-fuel engine and detection of a knocking state.

The second sensing unit 120 may include at least one of a pressure sensor 121 mounted on a common rail to sense fuel pressure of the common rail, a knocking sensor 122 mounted on a cylinder to sense information on the vibration frequency in the cylinder, a motor rotation counter sensor 123 mounted on a motor which drives a diesel fuel pump to sense the number of rotations of the motor, a first phase sensor 124 mounted on a flywheel placed at an end of the crankshaft of the dual-fuel engine to measure a rotation angle of the crankshaft, and a second phase sensor 125 mounted on a camshaft to detect a Top Dead Center (TDC) of a first cylinder in the dual-fuel engine. The second sensing unit 120 transfers the second sensing information including at least one of information on the fuel pressure of the common rail, information on the vibration frequency in the cylinder, information on the number of rotations of the motor, information on the rotation angle of the crankshaft and information on the TDC of the first cylinder to a second sensing information input unit 310 included in the EFI control unit 300.

The second sensing information input unit 310 transfers the received second sensing information to a second sensing information transfer unit 320. The second sensing information transfer unit 320 transfers the received second sensing information to the first sensing information input unit 210.

In the dual-fuel engine, micro-pilot injection is performed in the first place. An inlet valve is opened after the micro-pilot injection is performed, and at this point, timing control is needed to inject gas fuel, which is the main fuel. The micro-pilot injection means supplying diesel fuel to the common rail using a high-pressure pump and injecting the diesel fuel using an injector. At this point, the pressure sensor mounted on the common rail is controlled to measure fuel pressure of the common rail and to open a micro-pilot injection valve 10 to adjust the diesel pressure of the common rail to a desired level. In the case of the dual-fuel engine, the engine is ignited through the micro-pilot injection near the TDC. After the engine is ignited, the inlet valve is opened, and the gas fuel, i.e., the main fuel, is injected, and thus combustion may occur continuously. At this point, the diesel pressure of the common rail can be controlled using information on the number of rotations of the diesel fuel pump. Generally, the diesel fuel pump is connected to and driven by the crankshaft or the camshaft of the engine through a gear, or the diesel fuel pump is driven by a separate driving motor.

When the high-pressure pump is connected to the engine, information on the number of rotations of the diesel fuel pump can be obtained using a phase sensor 124. First and second phase sensors 124 and 125 are mounted on the flywheel placed at an end of the crankshaft and may sense a rotation angle of the crankshaft and/or TDC information of the first cylinder. The number of rotations of the diesel fuel pump can be obtained using the rotation angle of the crankshaft and the TDC information of the first cylinder sensed like this. In addition, if the diesel fuel pump is driven by a separate driving motor, a motor rotation counter sensor 123 mounted on the motor may sense the number of rotations of the motor which drives the diesel fuel pump.

<First State: Micro-Pilot Injection>

(Generation of First Control Signal)

Hereinafter, a normal state referred to in the present invention means a state in which knocking is not generated in the engine. An engine state determination unit 230 may generate a first control signal on the basis of at least one of the information included in the second sensing information transferred from the second sensing unit 120. For example, the first control signal may be determined on the basis of at least one of information on the frequency in the cylinder, information on the pressure of the common rail, information on the number of rotations of the motor and information on the TDC, which will be described below. That is, the engine state determination unit 230 derives knock intensity, which will be described below, on the basis of the information on the frequency in the cylinder. The first control signal can be generated when the derived knock intensity is lower than a reference value, the pressure of the common rail and the number of rotations of the motor are within a preset range, and the TDC is within a predetermined error range from a point where the micro-pilot injection occurs. The first control signal includes an injection start time point and an injection duration time of diesel fuel so that an appropriate engine state may be arrived in a normal state. Accordingly, 'generation of first control signal' means that the dual-fuel engine is in a normal state, not in a knocking state, and in an appropriate engine state in which the micro-pilot injection may occur.

(Control of Diesel Fuel Injection According to First Control Signal)

The first control signal is transferred from the engine state determination unit 230 to a control signal transfer unit 240. The control signal transfer unit 240 transfers the received first control signal to a first valve control unit 330. The first valve control unit 330 controls driving of the solenoid of the micro-pilot injection valve 10 according to the received first control signal to open the micro-pilot injection valve 10 at the time point of starting fuel injection, continuously maintain the open state of the micro-pilot injection valve 10 during the injection duration time, and close the micro-pilot injection valve 10 when the injection duration time is elapsed.

Describing this in detail, it is as shown below. The engine state determination unit 230 transfers the generated first control signal to a first control signal transfer unit 240. The first control signal transfer unit 240 transfers the received first control signal to the first valve control unit 330 included in the EFI control unit 300. The first valve control unit 330 generates a Pulse Width Modulation (PWM) signal on the basis of the first control signal and transfers the PWM signal to the micro-pilot injection valve 10. The micro-pilot injection valve 10 includes a solenoid coil, and the solenoid coil is controlled by the transferred PWM signal to open and close the valve.

(Transfer of Information to Deep Learning Unit)

The engine state determination unit 230 of the present invention may generate 'a first sensing information transfer signal', together with 'the first control signal information'. Generation of 'the first control signal information' indicates that the dual-fuel engine is not in a knocking state, but in a state appropriate to inject diesel fuel into the dual-fuel engine, and it means that an injection start time point of starting injection of diesel fuel and an injection duration time of maintaining the injection of diesel fuel are determined.

The first sensing information transfer signal is a signal informing to transfer the first sensing information and the second sensing information transferred to the engine state determination unit 230 to the sensing information transfer unit 220 at the time point of generating the first control signal. That is, the first sensing information transfer signal is a signal informing to transfer the first sensing information and the second sensing information indicating a state of the dual-fuel engine from the main control unit 200 to a deep learning unit 400 at the time point of generating the first control signal. The engine state determination unit 230 transfers the generated first sensing information transfer signal to the sensing information transfer unit 220. When the first sensing information transfer signal is received from the engine state determination unit 230, the sensing information transfer unit 220 may receive the first sensing information and the second sensing information transferred to the engine state determination unit 230 and transfer the received sensing information to a third sensing information input unit 410 included in the deep learning unit 400 at the time point of generating the first control signal.

The engine state determination unit 230 of the present invention transfers the created first control signal information to a control signal information transfer unit 250. The control signal information transfer unit 250 transfers the received first control signal information to a control signal information input unit 420 of the deep learning unit.

(Big Data Learning of Deep Learning Unit)

The control signal information transfer unit 250 transfers the received first control signal information to the control signal information input unit 420 of the deep learning unit 400. The sensing information transfer unit 220 transfers the received first and second sensing information to the third sensing information input unit 410. The control signal information input unit 420 and the third sensing information input unit 410 respectively transfer the received first control signal information and the first and second sensing information to a big data learning unit 430.

The big data learning unit 430 may recognize that the dual-fuel engine is not in a knocking state, but in a state appropriate to inject diesel fuel, from the received first control signal information and first and second sensing information, and derive an injection start time point and an injection duration time of diesel fuel.

For example, it is assumed that information on the pressure of the fuel filter and information on the temperature of the coolant are included in the first sensing information. It is assumed that a rotation angle of the crankshaft and fuel pressure information of the common rail are included in the second sensing information. In this case, the big data learning unit 430 may know pressure of the fuel filter in the dual-fuel engine, temperature of coolant, rotating strength of the crankshaft, and fuel pressure of the common rail at the time point of generating the first control signal. In addition, if the state of the dual-fuel engine corresponds to the pressure of the fuel filter in the dual-fuel engine, the temperature of coolant, the rotating strength of the crankshaft, and the fuel pressure of the common rail sensed as described above, it is understood that the dual-fuel engine is in a situation appropriate to inject diesel fuel, and an injection start time point and an injection duration time of the diesel fuel can be derived.

In addition, the big data learning unit 430 may perform learning on second to sixth control signal information described below. Optimum timing information for injecting diesel fuel according to various load variations can be obtained in a normal state, on the basis of the first to sixth control signal information and the first and second sensing information.

For example, it is assumed that while the dual-fuel engine is in a state according to the first and second sensing information, light knocking which will be described below is generated not long after injection of diesel fuel is finished after the injection of diesel fuel occurs at a specific time point for a specific injection duration time according to the first control signal information. In this case, the big data learning unit 430 may determine that the injection of diesel fuel according to the first control signal is inappropriate in the state according to the first and second sensing information.

Contrarily, if it is assumed that light knocking or heavy knocking is not generated although a predetermined time is elapsed after the injection of diesel fuel is finished, the big data learning unit 430 of this case may determine that the state of the dual-fuel engine having the first and second sensing information is a state appropriate to inject diesel fuel and the injection timing (the injection start time point and the injection duration time) according to the first control signal is also appropriate.

(Transfer of Learning Result)

The big data learning unit 430 may transfer a result of determining whether injection of diesel fuel is appropriate, the number of determinations, a time of making the determination, information on the state of the dual-fuel engine (first sensing information and second sensing information) at the time of determining whether injection of diesel fuel is appropriate, and information on diesel fuel injection timing to the engine state determination unit 230. The engine state determination unit 230 may adjust a condition for generating the first control signal on the basis of the information received from the big data learning unit 430.

Accordingly, the present invention may get out of the existing micro-pilot injection solely relying on the main control unit 200 and has an advantage of accomplishing active micro-pilot injection by feeding back a change of situation through big data learning.

<Second State: Injection of Gas Fuel>

(Generation of Second Control Signal)

The engine state determination unit 230 of the present invention may generate the second control signal on the basis of at least one of the rotation angle of the crankshaft and information on the frequency in the cylinder transferred from the second sensing unit 120. That is, the engine state determination unit 230 derives knock intensity which will be described below, on the basis of the received information on the frequency in the cylinder. If the knock intensity derived like this is lower than a reference value and the rotation angle of the crankshaft is within a range in which knocking is not generated, the engine state determination unit 230 may generate the second control signal for controlling open and close of a gas fuel inlet valve 20. When the dual-fuel engine is in a normal state, the second control signal generated by the engine state determination unit 230 controls open and close of the gas fuel inlet valve 20 to inject gas fuel into the cylinder of the dual-fuel engine at an appropriate injection time point for an appropriate injection time during the intake stroke cycle of the engine. In this case, the injection timing included in the second control signal is determined on the basis of the rotation angle of the crankshaft sensed by the phase sensor 124. That is, the second control signal is a signal for controlling an injection start time point and an injection ending angle for injecting gas fuel into the cylinder included in the engine, on the basis of the rotation angle of the crankshaft sensed by the phase sensor 124. Hereinafter, in the present invention, the injection ending angle means a rotation angle of the crankshaft at which injection of the gas fuel stops.

(Control of Diesel Fuel Injection According to Second Control Signal)

The second control signal is transferred from the engine state determination unit 230 to the control signal transfer unit 240. The control signal transfer unit 240 transfers the received second control signal to a second valve control unit 340. The second valve control unit 340 controls driving of the solenoid according to the received second control signal to open the gas fuel inlet valve 20 at the time point of starting fuel injection, continuously open the gas fuel inlet valve 20 until the injection ending angle is reached, and close the gas fuel inlet valve 20 when the injection ending angle is reached.

(Transfer of Information to Deep Learning Unit)

The engine state determination unit 230 of the present invention may generate 'a second sensing information transfer signal', together with 'the second control signal information'. Generation of 'the second control signal information' indicates that the dual-fuel engine is not in a knocking state, but in a state appropriate to inject gas fuel, and it means that an injection start time point at which injection of gas fuel occurs and an injection ending angle are determined.

The second sensing information transfer signal is a signal informing to transfer the first sensing information and the second sensing information transferred to the engine state determination unit 230 to the sensing information transfer unit 220 at the time point of generating the second control signal. The engine state determination unit 230 transfers the second sensing information transfer signal to the sensing information transfer unit 220. When the second sensing information transfer signal is received from the engine state determination unit 230, the sensing information transfer unit 220 may receive the first sensing information and the second sensing information transferred to the engine state determination unit 230 from the first sensing information input unit 10 and transfer the received sensing information to the third sensing information input unit 410 included in the deep learning unit 400 at the time point of generating the second control signal.

The engine state determination unit 230 of the present invention transfers the generated second control signal information to a control signal information transfer unit 250. The control signal information transfer unit 250 transfers the received second control signal information to the control signal information input unit 420 of the deep learning unit.

(Big Data Learning of Deep Learning Unit)

The control signal information transfer unit 250 transfers the received second control signal information to the control signal information input unit 420 of the deep learning unit 400. The sensing information transfer unit 220 transfers the received first and second sensing information to the third sensing information input unit 410. The control signal information input unit 420 and the third sensing information input unit 410 transfer the received second control signal information and the first and second sensing information to the big data learning unit 430, respectively.

The big data learning unit 430 may recognize that the dual-fuel engine is not in a knocking state, but in a state in which injection of gas fuel may occur, from the second control signal information and the first and second sensing information, and derive an injection time point at which injection of gas fuel may occur and a rotation angle of the crankshaft at which injection of gas fuel is ended.

For example, it is assumed that information on the pressure of the fuel filter and information on the temperature of the coolant are included in the first sensing information. It is assumed that information on the rotation angle of the crankshaft is included in the second sensing information. In this case, pressure of the fuel filter in the dual-fuel engine, temperature of the coolant, a rotating angle of the crankshaft at the time point of generating the second control signal can be known. Accordingly, it is understood that the current state of the dual-fuel engine is a state of beginning injection of gas fuel into the dual-fuel engine and that when the crankshaft reaches a preset injection ending angle, injection of the gas fuel stops.

Meanwhile, if it is assumed that the dual-fuel engine is in a state according to the first and second sensing information, injection of gas fuel occurs at a specific time point according to the second control signal information, and light knocking which will be described below is generated not long after the injection of gas fuel occurs, the big data learning unit 430 may determine that the injection of gas fuel according to the second control signal is inappropriate in the state of the dual-fuel engine according to the first and second sensing information. For example, the big data learning unit 430 may determine that the fuel injection timing included in the second control signal is inappropriate. Contrarily, when the light knocking or heavy knocking is not generated although a predetermined time is elapsed, the big data learning unit 430 may determine that the injection timing (the injection start time point and the injection ending angle) according to the second control signal is also appropriate.

(Transfer of Learning Result)

The big data learning unit 430 transfers a result of determining whether injection of gas fuel is appropriate, the number of determinations, a time of making the determination, information on the state of the dual-fuel engine (first sensing information and second sensing information) at the time of determining whether injection of gas fuel is appropriate, and information on gas fuel injection timing to the engine state determination unit 230. The engine state determination unit 230 may adjust a condition for generating the second control signal on the basis of the information received from the big data learning unit 430. Accordingly, the present invention may get out of the gas fuel injection solely relying on the main control unit 200 and has an advantage of accomplishing active injection of gas fuel by feeding back a change of situation through big data learning.

<Third State: Generation and Detection of Knocking>

If ignition time of the internal combustion engine is excessively advanced, knocking is generated due to abnormal combustion and may damage cylinders and pistons. Here, the advance means putting the ignition time forward. To prevent the damage, the main control unit 200 of the present invention may generate a control signal for preventing knocking and transfer the control signal to the EFI control unit 300 and the deep learning unit 400. Hereinafter, detection of knocking will be described in detail.

The engine state determination unit 230 receives information on the vibration frequency in the cylinder and the rotation angle of the crankshaft from the first sensing information input unit 210. Then, the engine state determination unit 230 may detect knocking by converting the vibration frequency information into a digital signal through an analog-digital converter, performing Fast Fourier Transform (FFT) on the signal, and analyzing frequency information of the vibration frequency. A vibration frequency signal existing within the section of the rotation angle of the crankshaft in which the knocking can be generated is filtered, among vibration frequency signals sensed by the knocking sensor 122. The filtered vibration frequency is integrated and outputted as an analog voltage. The analog voltage integrated and outputted like this is converted into a digital voltage through an analog-digital converter. Fast Fourier Transform (FFT) is performed on the converted digital voltage to generate a digital frequency (frequency analysis). The analyzed digital frequency is defined as knock intensity, and if the knock intensity is higher than a reference value, it is determined that knocking is generated. Meanwhile, a threshold of the knock intensity is set, and if the knock intensity is higher than the reference value and lower than the threshold, it is determined that light knocking is generated, and if the knock intensity is higher than the threshold, this is determined that heavy knocking is generated.

<Prevention of Light Knock (or Knocking)>

(Generation of Third and Fourth Control Signals)

If it is determined that light knocking is generated in the dual-fuel engine, the engine state determination unit 230 controls to lower the knock intensity. To this end, the engine state determination unit 230 may generate a third control signal for controlling the injection start time point and the injection duration time of diesel fuel and a fourth control signal for controlling the injection start time point and the injection ending angle of gas fuel. Accordingly, 'generation of third and fourth control signals' means that the dual-fuel engine is not in a normal state, but in a state in which knocking is generated.

(Control of Diesel and Gas Fuel Injection According to Third and Fourth Control Signals)

The third and fourth control signals generated by the engine state determination unit 230 are transferred to the EFI control unit 300. That is, the third and fourth control signals are transferred from the engine state determination unit 230 to the control signal transfer unit 240. The control signal transfer unit 240 transfers the received third control signal to the first valve control unit 330 and transfers the received fourth control signal to the second valve control unit 340.

The first valve control unit 330 included in the EFI control unit 300 controls driving of the solenoid of the micro-pilot injection valve 10 according to the received third control signal. The micro-pilot injection valve 10 is opened at the time point of starting fuel injection according to the control, the opened state is continued until a predetermined injection duration time is elapsed, and the micro-pilot injection valve 10 is closed after the injection duration time is elapsed.

The second valve control unit 340 included in the EFI control unit 300 controls driving of the solenoid of the gas fuel inlet valve 20 according to the received fourth control signal. The gas fuel inlet valve 20 is opened at the time point of starting fuel injection according to the control, the opened state of the gas fuel inlet valve 20 is continuously maintained until an injection ending angle is reached, and the gas fuel inlet valve 20 is closed when the injection ending angle is reached.

(Transfer of Information to Deep Learning Unit)

The engine state determination unit 230 of the present invention generates 'third and fourth sensing information transfer signals', together with 'the third and fourth control signal information'. Here, the third sensing information transfer signal and the fourth sensing information transfer signal are signals informing to transfer the first sensing information and the second sensing information transferred to the engine state determination unit 230 to the sensing information transfer unit 220 at the time point of generating the third control signal and the fourth control signal.

Generation of 'the third control signal information' means that the dual-fuel engine is in a knocking state and an injection start time point and an injection duration time of diesel fuel are determined to lower the knock intensity. In addition, generation of 'the fourth control signal information' means that the dual-fuel engine is in a knocking state and an injection start time point and an injection ending angle of gas fuel are determined to lower the knock intensity.

The engine state determination unit 230 of the present invention transfers the generated third and fourth control signal information to the control signal information transfer unit 250. The control signal information transfer unit 250 transfers the received third and fourth control signal information to the control signal information input unit 420 of the deep learning unit.

In addition, the engine state determination unit 230 transfers the third and fourth sensing information transfer signals to the sensing information transfer unit 220. When the third and fourth sensing information transfer signals are received from the engine state determination unit 230, the sensing information transfer unit 220 receives the first sensing information and the second sensing information transferred to the engine state determination unit 230 and transfers the first sensing information and the second sensing information to the third sensing information input unit 410 of the deep learning unit 400 at the time point of generating the third control signal or the fourth control signal.

(Big Data Learning of Deep Learning Unit)

The control signal information transfer unit 250 transfers the received third and fourth control signal information to the control signal information input unit 420 of the deep learning unit 400. The sensing information transfer unit 220 transfers the received first and second sensing information to the third sensing information input unit 410. The control signal information input unit 420 and the third sensing information input unit 410 transfer the received third and fourth control signal information and the first and second sensing information to the big data learning unit 430, respectively.

The big data learning unit 430 may recognize that the dual-fuel engine is in a light knock state from the third and fourth control signal information and the first and second sensing information, and according to this, the big data learning unit 430 derives a diesel fuel injection timing and a gas fuel injection timing that can lower the knock intensity.

The big data learning unit 430 derives information indicating that light knocking is generated from the third and fourth control signal information and derives injection timing information of diesel fuel and gas fuel according to the third and fourth control signal information. In addition, the big data learning unit 430 derives information on the state of the dual-fuel engine at the time point of generating the third and fourth control signals from the first and second sensing information. Then, the big data learning unit 430 matches the third and fourth control signal information and the first and second sensing information, and if the state of the dual-fuel engine is the same as a state according to the first and second sensing information received together with the third and fourth control signal information, the big data learning unit 430 may derive that light knocking is generated.

Data on the third and fourth control signal information and the first sensing information and the second sensing information at the time point of generating each of the control signal information may be accumulated in the big data learning unit 430 as many as to allow the big data learning. The big data learning unit 430 may determine generation of light knocking in advance on the basis of the accumulated data.

The big data learning unit 430 may predict generation of light knocking in advance on the basis of the third and fourth control signal information and the first and second sensing information. That is, if it is expected that a state of the dual-fuel engine based on the first and second sensing information will arrive at a state of the dual-fuel engine based on the first and second sensing information transferred together with the third and fourth control signal information, the big data learning unit 430 may predict that light knocking will be generated.

For example, the big data learning unit 430 may receive the third control signal information after receiving the second control signal information and the first and second sensing information. In this case, the big data learning unit 430 may determine that the dual-fuel engine is in a state according to the first and second sensing information transferred together with the second control signal information and predict that if the gas fuel injection timing is controlled in this state according to the second control signal, light knocking will be generated in the future.

In addition, the big data learning unit 430 may receive the third and fourth control signal information and receive again the third and fourth control signal information within a predetermined period. In this case, the big data learning unit 430 may determine that the fuel injection timing according to the former third and fourth control signal information is inappropriate. Contrarily, the big data learning unit 430 may not receive the third and fourth control signal information again after receiving the third and fourth control signal information although a predetermined period is elapsed. In this case, the big data learning unit 430 determines that the fuel injection timing included in the received third and fourth control signals is appropriate, and when generation of light knocking is expected, it transfers injection timing information of diesel fuel and gas fuel determined as being appropriate to the main control unit 200 and the EFI control unit 300, together with light knocking generation expectation information.

(Control of EFI Control Unit)

The big data learning unit 430 transfers the created light knocking generation expectation information and the injection timing information of diesel fuel and gas fuel to the EFI control unit 300. The first valve control unit 330 and the second valve control unit 340 may receive the light knocking generation expectation information and the injection timing information of diesel fuel and/or gas fuel from the big data learning unit 430. Although the first valve control unit 330 and the second valve control unit 340 do not receive the third and fourth control signals from the engine state determination unit 230, they may control open and close of the micro-pilot injection valve 10 according to the information on the injection start time point and the injection duration time of diesel fuel received from the big data learning unit 430 and prevent generation of light knocking in advance by controlling open and close of the gas fuel inlet valve 20 according to the information on the injection start time point and the injection ending angle of gas fuel.

Accordingly, according to the present invention, since the EFI control unit 300 prevents time delay until a control command is received from the main control unit 200 and the EFI control unit 300 itself may take a measure in advance not to generate the light knocking, there is an advantage of rapidly deriving the operation into a normal state. However, the EFI control unit 300 may receive a control command from the big data learning unit 430 or the main control unit 200. Accordingly, if the same control commands (at this point, the control command is a signal for adjusting a valve) are received from both of them at the same time, the control command of the big data learning unit 430 is processed in the first place. In addition, if a control command is received from any one of them and controls a valve and then the same control command is transmitted to the other side, this control signal is ignored. In addition, if control commands different from each other are received from both sides, the EFI control unit 300 executes the control commands in an order of receiving the control commands.

(Transfer of Big Data Learning Result to Main Control Unit)

The big data learning unit 430 may transfer the created light knocking generation expectation information and the injection timing information of diesel fuel and gas fuel to the engine state determination unit 230. The engine state determination unit 230 adjusts a condition for generating any one of the first to fourth control signals on the basis of the light knocking generation expectation information and the injection timing information of diesel fuel and gas fuel received from the big data learning unit 430. Accordingly, the present invention has an advantage of preventing generation of light knocking in the dual-fuel engine, rapidly getting out of the light knocking state if the dual-fuel engine is already in the light knocking state, and preventing damage of the dual-fuel engine by taking a measure not to generate the light knocking again.

<Prevention of Heavy Knocking>

(Generation of Fifth and Sixth Control Signals)

If it is determined that heavy knocking is generated in the dual-fuel engine, the engine state determination unit 230 generates a fifth control signal for controlling the micro-pilot injection valve 10 to be closed and a sixth control signal for controlling the gas fuel inlet valve 20 to be closed to shut down the engine. Accordingly, 'generation of the fifth and sixth control signals' means that the dual-fuel engine is not in a normal state, but in a state in which heavy knocking is generated.

(Control of Diesel Fuel and Gas Fuel Injection According to Fifth and Sixth Control Signals)

The fifth and sixth control signals generated by the engine state determination unit 230 are transferred to the EFI control unit 300. The fifth and sixth control signals are transferred from the engine state determination unit 230 to the control signal transfer unit 240. The control signal transfer unit 240 transfers the received fifth and sixth control signals to the first and second valve control units 330 and 340.

The first valve control unit 330 included in the EFI control unit 300 controls driving of the solenoid to close the micro-pilot injection valve 10 according to the received fifth control signal. The second valve control unit 340 included in the EFI control unit 300 controls driving of the solenoid to close the gas fuel inlet valve 20 according to the received sixth control signal.

(Transfer of Information to Deep Learning Unit)

The engine state determination unit 230 generates 'fifth and sixth sensing information transfer signals', together with 'the fifth and sixth control signal information'. Here, the fifth sensing information transfer signal and the sixth sensing information transfer signal are signals informing to transfer the first sensing information and the second sensing information transferred to the engine state determination unit 230 to the sensing information transfer unit 220 at the time point of generating the fifth control signal and the sixth sensing signal.

In the present invention, generation of 'the fifth control signal information' means that the dual-fuel engine is in the heavy knocking state and the micro-pilot injection valve 10 is closed to shut down the engine. In addition, generation of 'the sixth control signal information' means that the dual-fuel engine is in the heavy knocking state and the gas fuel inlet valve 20 is closed to shut down the engine.

The engine state determination unit 230 of the present invention transfers the generated fifth and sixth control signal information to the control signal information transfer unit 250. The control signal information transfer unit 250 transfers the received fifth and sixth control signal information to the control signal information input unit 420 of the deep learning unit.

In addition, the engine state determination unit 230 transfers the fifth and sixth sensing information transfer signals to the sensing information transfer unit 220. When the fifth and sixth sensing information transfer signals are received from the engine state determination unit 230, the sensing information transfer unit 220 receives the first sensing information and the second sensing information transferred to the engine state determination unit 230 transfers the first sensing information and the second sensing information to the third sensing information input unit 410 at the time point of generating the fifth and sixth control signals and.

(Big Data Learning of Deep Learning Unit)

The control signal information transfer unit 250 transfers the received fifth and sixth control signal information to the control signal information input unit 420 of the deep learning unit 400. The sensing information transfer unit 220 transfers the received first and second sensing information to the third sensing information input unit 410. The control signal information input unit 420 and the third sensing information input unit 410 transfers the received fifth and sixth control signal information and the first and second sensing information to the big data learning unit 430.

The big data learning unit 430 may know that the dual-fuel engine is in the heavy knocking state from the fifth and sixth control signal information and the first and second sensing information, and the big data learning unit 430 controls the micro-pilot injection valve 10 and the gas fuel inlet valve 20 to be closed to shut down the engine according thereto.

Data on the fifth and sixth control signal information and the first and second sensing information corresponding to each of the control signal information may be accumulated in the big data learning unit 430 as many as to allow the big data learning. The big data learning unit 430 may determine generation of heavy knocking in advance on the basis of the accumulated data.

The big data learning unit 430 may predict generation of heavy knocking in advance on the basis of the fifth and sixth control signal information and the first and second sensing information described above.

The big data learning unit 430 may predict generation of heavy knocking in advance on the basis of the fifth and sixth control signal information and the first and second sensing information. That is, if it is expected that a state of the dual-fuel engine based on the first and second sensing information will arrive at a state of the dual-fuel engine based on the first and second sensing information transferred together with the fifth and sixth control signal information, the big data learning unit 430 may predict that heavy knocking will be generated.

For example, the big data learning unit 430 may receive the fifth and sixth control signal information after receiving the third and fourth control signal information and the first and second sensing information. In this case, the big data learning unit 430 may determine that the dual-fuel engine is in a state according to the first and second sensing information transferred together with the fifth and sixth control signal information and predict that if the gas fuel and diesel fuel injection timings are controlled in this state according to the third and fourth control signal, heavy knocking will be generated in the future.

In addition, if it is expected that heavy knocking will be generated, the big data learning unit 430 transfers heavy knocking generation expectation information, information on closure of the micro-pilot injection valve 10, and information on closure of the gas fuel inlet valve 20 to the main control unit 200 and the EFI control unit 300.

(Control of EFI Control Unit)

The big data learning unit 430 may transfer the created heavy knocking generation expectation information, information on closure of the micro-pilot injection valve 10, and information on closure of the gas fuel inlet valve 20 to the EFI control unit 300.

The first valve control unit 330 may receive the heavy knocking generation expectation information and the information on closure of the micro-pilot injection valve 10 from the big data learning unit 430. The first valve control unit 330 and the second valve control unit 340 may receive the heavy knocking generation expectation information and the information on closure of the gas fuel inlet valve 20 from the big data learning unit 430. Although the first valve control unit 330 and the second valve control unit 340 do not receive the fifth and sixth control signals from the engine state determination unit 230, they close the valves 10 and 20 according to the information on closure of the micro-pilot injection valve 10 and the information on closure of the gas fuel inlet valve 20 received from the big data learning unit 430.

Therefore, according to the present invention, since the EFI control unit prevents time delay until a control command is received from the main control unit 200 and the EFI control unit itself may take a measure in advance not to generate heavy knocking, there is an advantage of preventing damage of the engine.

(Transfer of Big Data Learning Result to Main Control Unit)

The big data learning unit 430 may transfer the created heavy knocking generation expectation information, the information on closure of the micro-pilot injection valve 10, and the information on closure of the gas fuel inlet valve 20 to the main control unit 200.

The engine state determination unit 230 adjusts a condition for generating any one of the first to sixth control signals on the basis of the heavy knocking generation expectation information, the information on closure of the micro-pilot injection valve 10, and the information on closure of the gas fuel inlet valve 20 received from the big data learning unit 430. Accordingly, the present invention has an advantage of preventing heavy knocking in advance from being generated in the dual-fuel engine.

The present invention has an advantage of deriving an optimum fuel injection timing in real-time using a deep learning unit according to the condition of a dual-fuel engine.

Furthermore, the present invention has an advantage of preventing damage of a dual-fuel engine by predicting generation of knocking in advance using a deep learning unit and controlling to suppress generation of the knocking in advance by directly providing an EFI control unit with information on generation of knocking before receiving a control signal from a main control unit.

What is claimed is:

1. A dual-fuel engine control system comprising:
   a sensor for generating sensing information by sensing a parameter related to a dual-fuel engine;
   a main controller for receiving the sensing information from the sensor and generating a control signal for controlling a micro-pilot injection valve and a gas fuel inlet valve by analyzing a state of the dual-fuel engine on a basis of the sensing information;
   an electric fuel injection (EFI) controller for receiving the control signal generated by the main controller and controlling the micro-pilot injection valve and the gas fuel inlet valve on a basis of the control signal; and
   a deep learning analyzer for analyzing a state of the dual-fuel engine on the basis of the control signal transferred from the main controller and the sensing information transferred to the main controller at a time point of generating the control signal, and transferring an analysis result to at least one of the main controller and the EFI controller, wherein
   when the analysis result is received from the deep learning analyzer, the EFI controller controls the micro-pilot injection valve and the gas fuel inlet valve before receiving the control signal from the main controller, and
   wherein the control signal comprises a first to sixth control signal and wherein the deep learning analyzer receives first to sixth control signal information and the sensing information at a time point of generating the first to sixth control signals from the main controller, and determines that a state of the dual-fuel engine is any one of a normal state, a light knocking generation expected state, and a heavy knocking generation expected state on the basis of the received signal and sensing information.

2. The system according to claim 1, wherein the sensor includes:
   a first sensor for generating first sensing information including at least one of information on temperature of coolant, information on the number of rotations of the engine and information on pressure of a fuel filter; and
   a second sensor for generating second sensing information including at least one of information on fuel pressure of a common rail, information on vibration frequency in a cylinder, information on the number of rotations of a motor which drives a diesel fuel pump, a rotation angle of a crankshaft, and a Top Dead Center (TDC) of a first cylinder.

3. The system according to claim 1, wherein
   the main controller generates the first control signal for controlling open and close timing of the micro-pilot injection valve on the basis of the sensing information and the first control signal information, which is information based on the first control signal, and transfers the sensing information expressing a state of the dual-fuel engine at a time point of generating the first control signal,
   the EFI controller receives the first control signal from the main controller and controls the micro-pilot injection valve according to the transferred first control signal, and
   the deep learning analyzer receives the first control signal information and the sensing information transferred to the main controller at a time point of generating the first control signal from the main controller.

4. The system according to claim 1, wherein
   the main controller generates the second control signal for controlling open and close timing of the gas fuel inlet valve on the basis of the sensing information and the second control signal information, which is information based on the second control signal, and transfers sensing information which expresses a state of the dual-fuel engine at a time point of generating the second control signal,
   the EFI controller receives the second control signal from the main controller and controls the gas fuel inlet valve according to the transferred second control signal, and
   the deep learning analyzer receives the second control signal information and the sensing information transferred to main controller at a time point of generating the second control signal from the main controller.

5. The system according to claim 1, wherein the deep learning analyzer derives injection timing information of the diesel fuel and the gas fuel so that the dual-fuel engine is in a first state and transfers the injection timing information to the main controller if it is determined that the dual-fuel engine in a normal operating state, and the main controller regenerates the first and second control signals on the basis of the transferred injection timing information and transfers the regenerated first and second control signals to the EFI controller.

6. The system according to claim 5, wherein
   the deep learning analyzer derives light knocking generation expectation information predicting generation of the light knocking and injection timing information of the diesel fuel and the gas fuel for preventing generation of the light knocking, and transfers the light knocking generation expectation information and the injection timing information to the main controller and the EFI controller, if it is predicted in advance that the light knocking will be generated in the dual-fuel engine,
   the EFI controller controls the micro-pilot injection valve and the gas fuel inlet valve according to the injection timing information when the light knocking generation expectation information and the injection timing information are received, and
   the main controller adjusts any one of the first to fourth control signals on the basis of the received light knocking generation expectation information and the injection timing information.

7. The system according to claim 5, wherein
the deep learning analyzer transfers heavy knocking generation expectation information and valve closure information to the main controller and the EFI controller, if it is predicted in advance that the heavy knocking will be generated in the dual-fuel engine,
the EFI controller closes the micro-pilot injection valve and the gas fuel inlet valve when the heavy knocking generation expectation information and the valve closure information are received, and
the main controller adjusts any one of the first to sixth control signals on the basis of the received heavy knocking generation expectation information and the valve closure information.

8. A dual-fuel engine control system comprising:
a sensor for generating sensing information by sensing a parameter related to a dual-fuel engine;
a main controller for receiving the sensing information from the sensor and generating a control signal for controlling a micro-pilot injection valve and a gas fuel inlet valve by analyzing a state of the dual-fuel engine on a basis of the sensing information;
an electric fuel injection (EFI) controller for receiving the control signal generated by the main controller and controlling the micro-pilot injection valve and the gas fuel inlet valve on a basis of the control signal; and
a deep learning analyzer for analyzing a state of the dual-fuel engine on the basis of the control signal transferred from the main controller and the sensing information transferred to the main controller at a time point of generating the control signal, and transferring an analysis result to at least one of the main controller and the EFI controller, wherein
when the analysis result is received from the deep learning analyzer, the EFI controller controls the micro-pilot injection valve and the gas fuel inlet valve before receiving the control signal from the main controller,
wherein the sensor includes:
a first sensor for generating first sensing information including at least one of information on temperature of coolant, information on the number of rotations of the engine and information on pressure of a fuel filter; and
a second sensor for generating second sensing information including at least one of information on fuel pressure of a common rail, information on vibration frequency in a cylinder, information on the number of rotations of a motor which drives a diesel fuel pump, a rotation angle of a crankshaft, and a Top Dead Center (TDC) of a first cylinder, and
wherein the main controller determines generation of knocking on the basis of the sensing information, in which the knocking is determined to be divided into light knocking and heavy knocking, generates the third control signal for controlling open and close of the micro-pilot injection valve and the fourth control signal for controlling open and close of the gas fuel inlet valve if it is determined that the light knocking is generated, and generates the fifth control signal for controlling the micro-pilot injection valve to be closed and the sixth control signal for controlling the gas fuel inlet valve to be closed to shut down the dual-fuel engine if it is determined that the heavy knocking is generated, and the EFI controller receives the third to sixth control signals from the main controller, controls the micro-pilot injection valve according to the transferred third control signal and the fifth control signal, and controls the gas fuel inlet valve according to the fourth control signal and the sixth control signal.

9. The system according to claim 8, wherein generation of the knocking is determined in the steps of:
filtering a vibration frequency signal existing within a section of the rotation angle of the crankshaft in which the knocking can be generated, among vibration frequency signals;
integrating the filtered vibration frequency as an analog voltage and outputting the analog voltage;
converting the outputted analog voltage into a digital voltage;
converting the converted digital voltage into a digital frequency by performing Fast Fourier Transform (FFT) on the converted digital voltage; and
determining that the knocking is generated if the converted digital frequency is higher than a reference value.

* * * * *